(12) United States Patent
Simmons et al.

(10) Patent No.: US 10,025,555 B2
(45) Date of Patent: Jul. 17, 2018

(54) BYTE ORDER DETECTION FOR CONTROL SYSTEM DATA EXCHANGE

(71) Applicant: Mettler-Toledo, LLC, Columbus, OH (US)

(72) Inventors: Venus Simmons, Sunbury, OH (US); Mark Whitt, Westerville, OH (US); Andri Toggenburger, Moenchaltorf (CH)

(73) Assignee: Mettler-Toledo, LLC, Columbus, OH (US)

( * ) Notice: Subject to any disclaimer, the term of this patent is extended or adjusted under 35 U.S.C. 154(b) by 127 days.

(21) Appl. No.: 15/253,749

(22) Filed: Aug. 31, 2016

(65) Prior Publication Data
US 2018/0060035 A1    Mar. 1, 2018

(51) Int. Cl.
*G06F 7/02*    (2006.01)
*G06F 13/10*    (2006.01)

(52) U.S. Cl.
CPC .............. *G06F 7/02* (2013.01); *G06F 13/102* (2013.01)

(58) Field of Classification Search
CPC ................................. G06F 7/02; G06F 13/102
See application file for complete search history.

(56) References Cited

U.S. PATENT DOCUMENTS

| | | | |
|---|---|---|---|
| 5,828,853 A * | 10/1998 | Regal | G06F 7/768 710/315 |
| 7,139,905 B2 | 11/2006 | Filer et al. | |
| 7,293,040 B2 | 11/2007 | Terada | |
| 7,334,066 B2 | 2/2008 | Lee | |
| 7,404,019 B2 | 7/2008 | Moyer et al. | |
| 7,533,225 B1 | 5/2009 | Bonwick et al. | |
| 2004/0059848 A1 * | 3/2004 | Chang | G06F 13/4013 710/65 |
| 2004/0153781 A1 * | 8/2004 | Lee | G06F 13/4013 714/25 |
| 2004/0221173 A1 * | 11/2004 | Moyer | G06F 13/4013 713/189 |
| 2006/0277399 A1 * | 12/2006 | Sakamaki | G06F 13/4013 712/300 |
| 2009/0006485 A1 * | 1/2009 | Jung | G06F 13/4013 |

(Continued)

FOREIGN PATENT DOCUMENTS

| | | |
|---|---|---|
| JP | 4-127251 A | 4/1992 |
| WO | 94/15269 A2 | 7/1994 |

OTHER PUBLICATIONS

Intel, Endianness White Paper, Nov. 15, 2004, 22 pages, Intel.

*Primary Examiner* — Nimesh G Patel
(74) *Attorney, Agent, or Firm* — Standley Law Group LLP (57) ABSTRACT

Devices and methods for detecting the byte order (endianness) of a control device with which a peripheral device will exchange data. The control device initially transmits a special byte order determination data command to the peripheral device, which data command includes both a byte sequence having a byte order that can be read in any direction and still have the same value, and a specific data value that is known to both the control device and the peripheral device. Control device byte order is subsequently revealed by using the peripheral device to analyze the data value of the byte order determination data command in each of several possible byte orders to determine which byte order format results in a return of the expected specific value.

17 Claims, 5 Drawing Sheets

(56) References Cited

U.S. PATENT DOCUMENTS

| | | | |
|---|---|---|---|
| 2011/0154306 A1* | 6/2011 | Domeika | G06F 8/51 |
| | | | 717/141 |
| 2012/0170079 A1 | 7/2012 | Susi, III et al. | |
| 2015/0106793 A1* | 4/2015 | Kahne | G06F 11/3648 |
| | | | 717/130 |

* cited by examiner

FIG. 1

| Floating Point Data (Write) ||
|---|---|
| WORD 0 | Floating Point Value (32-bit), optionally used with Commond |
| WORD 1 | |
| WORD 2 | 16-bit Channel Mask |
| WORD 3 | 16-bit Command |

FIG. 2

Little Endian

Two Byte Values
| | Memory | |
|---|---|---|
| ADDRESS 0 | Byte$_0$ | LSB |
| ADDRESS 1 | Byte$_1$ | MSB |

Four Byte Values
| | Memory | |
|---|---|---|
| ADDRESS 0 | Byte$_0$ | LSB |
| ADDRESS 1 | Byte$_1$ | |
| ADDRESS 2 | Byte$_2$ | |
| ADDRESS 3 | Byte$_3$ | MSB |

Big Endian

Two Byte Values
| | Memory | |
|---|---|---|
| ADDRESS 0 | Byte$_1$ | MSB |
| ADDRESS 1 | Byte$_0$ | LSB |

Four Byte Values
| | Memory | |
|---|---|---|
| ADDRESS 0 | Byte$_3$ | LSB |
| ADDRESS 1 | Byte$_2$ | |
| ADDRESS 2 | Byte$_1$ | |
| ADDRESS 3 | Byte$_0$ | MSB |

Byte Swap

Two Byte Values
| | Memory | |
|---|---|---|
| ADDRESS 0 | Byte$_1$ | LSB |
| ADDRESS 1 | Byte$_0$ | MSB |

Four Byte Values
| | Memory | |
|---|---|---|
| ADDRESS 0 | Byte$_1$ | LSB |
| ADDRESS 1 | Byte$_0$ | |
| ADDRESS 2 | Byte$_3$ | |
| ADDRESS 3 | Byte$_2$ | MSB |

Word Swap

Two Byte Values
| | Memory | |
|---|---|---|
| ADDRESS 0 | Byte$_0$ | MSB |
| ADDRESS 1 | Byte$_1$ | LSB |

Four Byte Values
| | Memory | |
|---|---|---|
| ADDRESS 0 | Byte$_2$ | LSB |
| ADDRESS 1 | Byte$_3$ | |
| ADDRESS 2 | Byte$_0$ | |
| ADDRESS 3 | Byte$_1$ | MSB |

FIG. 3

Byte Order = Little Endian

| | | DATA | Byte Order |
|---|---|---|---|
| WORD 0 | ADDRESS 0 | 0xD7 | Byte$_0$ |
| | ADDRESS 1 | 0xA3 | Byte$_1$ |
| WORD 1 | ADDRESS 2 | 0x30 | Byte$_2$ |
| | ADDRESS 3 | 0x40 | Byte$_3$ |
| WORD 2 | ADDRESS 4 | 0x80 | |
| | ADDRESS 5 | 0x80 | |
| WORD 3 | ADDRESS 6 | 0x80 | |
| | ADDRESS 7 | 0x80 | |

Rows span: Floating Point Value(2.76) spans WORD 0–1; Command Word 0 (0x80, 0x80) spans WORD 2; Command Word 1 (0x80, 0x80) spans WORD 3.

Byte Order = Byte Swap

| | | DATA | Byte Order |
|---|---|---|---|
| WORD 0 | ADDRESS 0 | 0xA3 | Byte$_1$ |
| | ADDRESS 1 | 0xD7 | Byte$_0$ |
| WORD 1 | ADDRESS 2 | 0x40 | Byte$_3$ |
| | ADDRESS 3 | 0x30 | Byte$_2$ |
| WORD 2 | ADDRESS 4 | 0x80 | |
| | ADDRESS 5 | 0x80 | |
| WORD 3 | ADDRESS 6 | 0x80 | |
| | ADDRESS 7 | 0x80 | |

Floating Point Value(2.76) spans WORD 0–1; Command Word 0 (0x80, 0x80) spans WORD 2; Command Word 1 (0x80, 0x80) spans WORD 3.

Byte Order = Big Endian

| | | DATA | Byte Order |
|---|---|---|---|
| WORD 0 | ADDRESS 0 | 0x40 | Byte$_3$ |
| | ADDRESS 1 | 0x30 | Byte$_2$ |
| WORD 1 | ADDRESS 2 | 0xA3 | Byte$_1$ |
| | ADDRESS 3 | 0xD7 | Byte$_0$ |
| WORD 2 | ADDRESS 4 | 0x80 | |
| | ADDRESS 5 | 0x80 | |
| WORD 3 | ADDRESS 6 | 0x80 | |
| | ADDRESS 7 | 0x80 | |

Floating Point Value(2.76) spans WORD 0–1; Command Word 0 (0x80, 0x80) spans WORD 2; Command Word 1 (0x80, 0x80) spans WORD 3.

Byte Order = Word Swap

| | | DATA | Byte Order |
|---|---|---|---|
| WORD 0 | ADDRESS 0 | 0x30 | Byte$_2$ |
| | ADDRESS 1 | 0x40 | Byte$_3$ |
| WORD 1 | ADDRESS 2 | 0xD7 | Byte$_0$ |
| | ADDRESS 3 | 0xA3 | Byte$_1$ |
| WORD 2 | ADDRESS 4 | 0x80 | |
| | ADDRESS 5 | 0x80 | |
| WORD 3 | ADDRESS 6 | 0x80 | |
| | ADDRESS 7 | 0x80 | |

Floating Point Value(2.76) spans WORD 0–1; Command Word 0 (0x80, 0x80) spans WORD 2; Command Word 1 (0x80, 0x80) spans WORD 3.

BYTE ORDER DETECTION FOR CONTROL SYSTEM DATA EXCHANGE

TECHNICAL FIELD

Exemplary embodiments described herein are directed to systems and methods for ensuring proper byte order during a data exchange operation.

BACKGROUND

Byte order, or "endianness" or "endian architecture" as it is also frequently referred to, should be familiar to one of skill in the art. Generally speaking, computer data normally comprises a plurality of digital words that are each formed from a multitude of different bytes, each byte typically being stored in an address of a memory array. When it is desired or necessary to break a large word into smaller words, the order in which the bytes of the smaller words are stored in memory can be important to recognition of the data by various computing devices. In other words, not all computing devices are designed to read data in the same order, i.e., not all computing devices have the same endianness.

There are two well-known and industry accepted byte order storage (endianness) formats or architectures that apply equally well to data structures whose representation requires two or more bytes of data, such as two byte integer values. These formats are known as big endian and little endian. In a big endian format, the most significant byte of data is stored in the lowest memory address. In a little endian format, the least significant byte of data is stored in the lowest memory address.

In addition to the big and little endian storage formats, there are two other popular byte order combinations that are applicable to data structures whose representation requires four or more bytes of data, such as Single Precision Floating Point (REAL) values and Double Integers (DINT's). The first of these alternative byte orders may follow the protocol of either the big endian or little endian format with respect to what byte is stored in the lowest memory address, however, there is a swapping of the bytes in each of the two byte words (for a total of four bytes). This byte order will be referred to herein as the "byte swap" byte order. The second of the alternative byte orders may again follow the protocol of either the big endian or little endian format with respect to what byte is stored in the lowest memory address, however, there is a swapping of the two byte word units (again, for a total of four bytes). This byte order will be referred to herein as the "word swap" byte order.

Issues relating to byte order conflicts often, but not exclusively, arise in the context of a data exchange/data sharing between two computing devices (e.g., a computing system/control device and a peripheral device). As should be apparent, a computing device that is provided with data in one architecture while expecting the other, may read the data in the opposite direction from that intended or otherwise not understand the data that is received.

In light of the aforementioned potential endianness conflicts, devices and techniques have been developed to help ensure that data transfers between devices occur with a proper byte order. On a most basic level, a number of devices are designed and constructed to permit byte order configuration by a user. For example, knowing the endianness of the controlling device, a user may configure the endianness of a peripheral device from which data will be received. Such a configuration may occur manually or through software. A primary drawback to this technique is, of course, that the user is required to know the proper byte order and also understand how to set the byte order on the appropriate device.

Other proper byte ordering techniques and devices have also been developed. One such device is a bi-endian processor, which may selectively operate in either big endian or little endian mode based on the placement of a jumper or based on the output of a special selection circuit. Byte swapping techniques have also been developed to deal with endianness conflicts between computing systems and associated peripheral devices. According to one such technique, the endianness of the computing system is set in a configuration register, the endian information of the peripheral devices is read and compared to the stored endianness of the computing system, and if there is a conflict, the peripheral device data is byte-swapped before transfer to the computing device. Other similar byte-swapping techniques are also known, including those that employ a physical byte swapping device or specialized byte-swapping software between the data-transferring device and data-receiving device of interest. In each such case, however, it is believed that the endianness of the controlling system/device must be known or the controlling system/device must be used to determine the endianness of a peripheral device(s) of interest and to cause a byte swap to occur if an endianness mismatch is discovered.

While known devices and techniques for reconciling byte order conflicts are no doubt useful, it should also be apparent that these devices and techniques have various limitations and drawbacks. Perhaps paramount in this regard is the requirement of knowing the endianness of the computing/controlling system or using the computing/controlling system to cause a byte swap to occur subsequent to the transmission of data by a peripheral or other device in communication with the computing/controlling system. Exemplary inventive embodiments described herein are believed to overcome such limitations and drawbacks.

SUMMARY

Exemplary system and method embodiments described herein do not require a user to know the endianness of a computing system or control device with which one or more other (peripheral) devices of interest will share data. This is a useful feature because, as would be well understood to one of skill in the art, it is frequently required to place a new or replacement peripheral or other device in communication with a computing system or control device whose endianness is unknown. Furthermore, it is also common in such a situation for a user to have no control over the computing system or control device.

As an example of such an aforementioned situation, consider a factory setting where a plurality of machines (peripheral devices) report to a centralized master controller (computing device) of an automated control system. It is not uncommon for the manufacturer or installer of such machines to be different from the manufacturer installer of the control system and, thus, the master controller. As such, despite the fact that the machinery must transmit data to the master controller, the endianness of the master controller may be entirely unknown. Likewise, the control system and its master controller may have been provided with the assumption that any other devices sharing data therewith would have a matching endianness and, therefore, no byte-swapping or other such capabilities may have been provided to deal with an byte order conflict. Other potentially problematic examples also abound, such as without limitation, the installation or replacement of one or more weighing modules (e.g., load cells) that report to a master scale controller of a weighing scale.

To this end, exemplary device and method embodiments described herein eliminate the need for a user to know the endianness of a computing system or control device with which one or more other (peripheral) devices of interest will exchange data. Likewise, exemplary device and method embodiments described herein eliminate the need to provide specialized software and/or hardware for performing the byte-swapping of data transferred by such peripheral devices to a computing system or other control device.

Broadly speaking, exemplary peripheral device embodiments described herein are adapted to communicate with a control device having an unknown byte order. This is accomplished by imparting an exemplary peripheral device with the ability to receive a command from a control device having an unknown byte order. The command is sent with a byte sequence that can be read in any byte order and still have the same value. The command also includes a data value that is known to both the control device and the peripheral device and has a unique value in each of its byte locations, thereby allowing the peripheral device to determine the byte order that the controller is using to send the command. If necessary, the peripheral device then switches its byte order to match the byte order of the control device so that future commands and data transfers will occur with the proper byte order.

Other aspects and features of the inventive concept will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and.

DETAILED DESCRIPTION OF THE EXEMPLARY EMBODIMENTS

Figure 1:
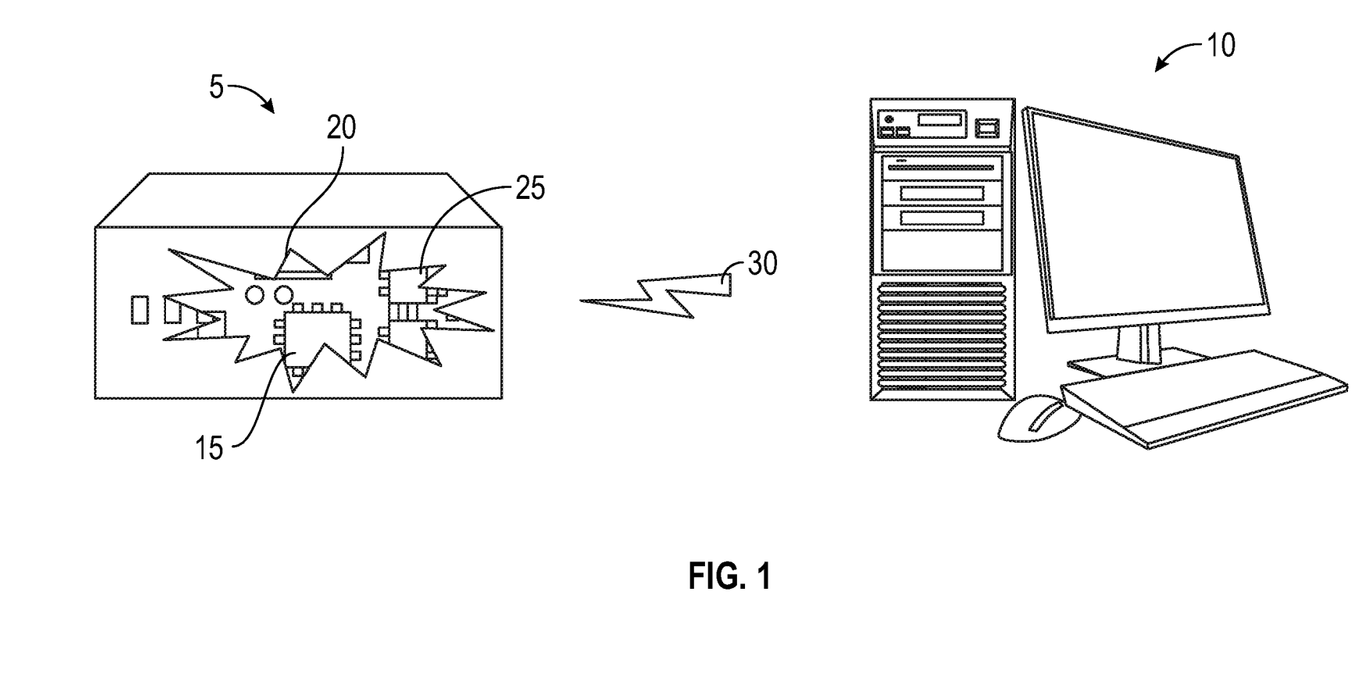
FIG. 1 schematically represents an exemplary peripheral device embodiment communicating with a control device to determine the endianness of the control device.

One exemplary embodiment of a peripheral device 5 adapted to communicate with a control device 10 in a manner to determine the endianness of the control device is schematically represented in FIG. 1. The peripheral device 5 may include a microprocessor 15, memory 20, programming (e.g., software), wired and/or wireless communication elements 25, and/or various other components that enable the peripheral device to perform its duties and also communicate with the control device 10. The peripheral device 5 may be a weighing device such as a weighing module or a load cell, or may be some other non-weighing device.

The control device is programmed to send a special byte order determination data command 30 to the peripheral device, and the peripheral device 5 is programmed to receive the byte order determination data command from the control device 10, in order to determine the byte order used by the control device. This data exchange may occur automatically upon installation of the peripheral device. Alternatively, this data exchange may occur only after proper initiation by a user of programming/software associated with the peripheral device 10.

As indicated in FIG. 1, the wired or wireless data exchange between the peripheral device 5 and the control device 10 begins with the control device sending a byte order determination data command 30. The byte order determination data command 30 has a byte sequence that can be read in any byte order and still have the same value (e.g., 80 80 80 80 hexadecimal). Thus, the peripheral device 5 is able to receive and recognize the byte order determination data command 30 even if there is a byte order mismatch between the peripheral device and the control device 10. The command also includes a data value (e.g., 2.76) that is known to both the control device 10 and the peripheral device 5 and has a unique value in each of its byte locations. This known data value is used by the peripheral device 5 to determine the byte order of the control device 10.

Figure 2:
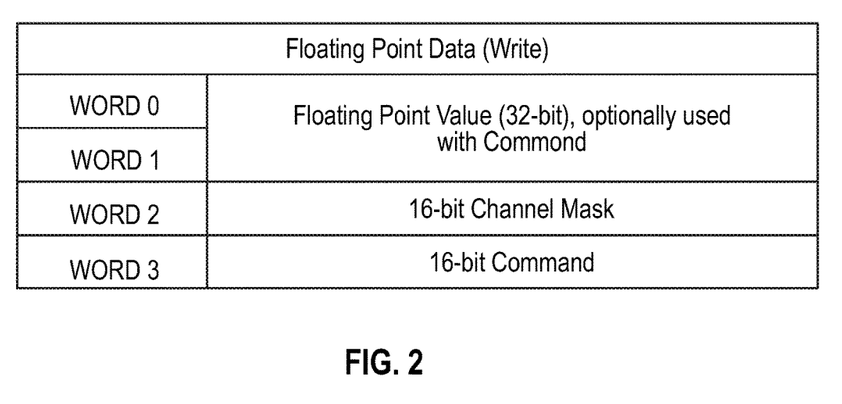
FIG. 2 schematically depicts the basic structure of one exemplary byte order determination data command.
Figure 4:
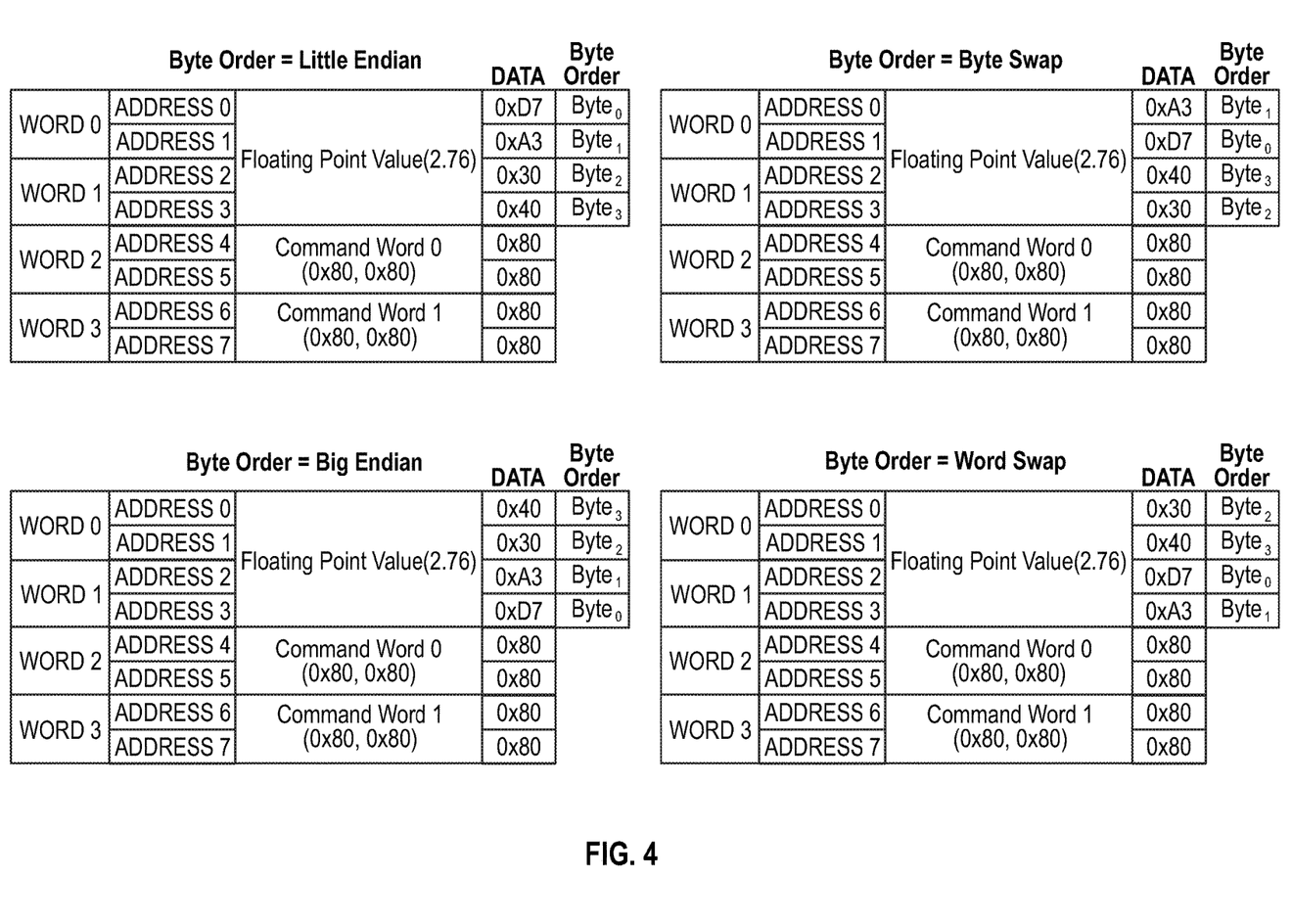
FIG. 4 is a chart representing device byte order determination by identifying which one of several possible byte order formats returns a value that matches a transmitted known data value.

The basic structure of the byte order determination data command 30 sent by the control device is represented in FIG. 2. Due to possible differences in byte order, both Word 2 and Word 3 of the command structure shown in FIG. 2 are utilized in the byte order determination data command 30. More specifically, and as shown in more detail in FIG. 4, Word 0 and Word 1 of the byte order determination data command structure may be used to transmit the known data value (e.g., 2.76), while Word 2 and Word 3 may be used to transmit the byte sequence that can be read in any byte order and still have the same value (e.g., 80 80 80 80 hexadecimal).

Figure 3:
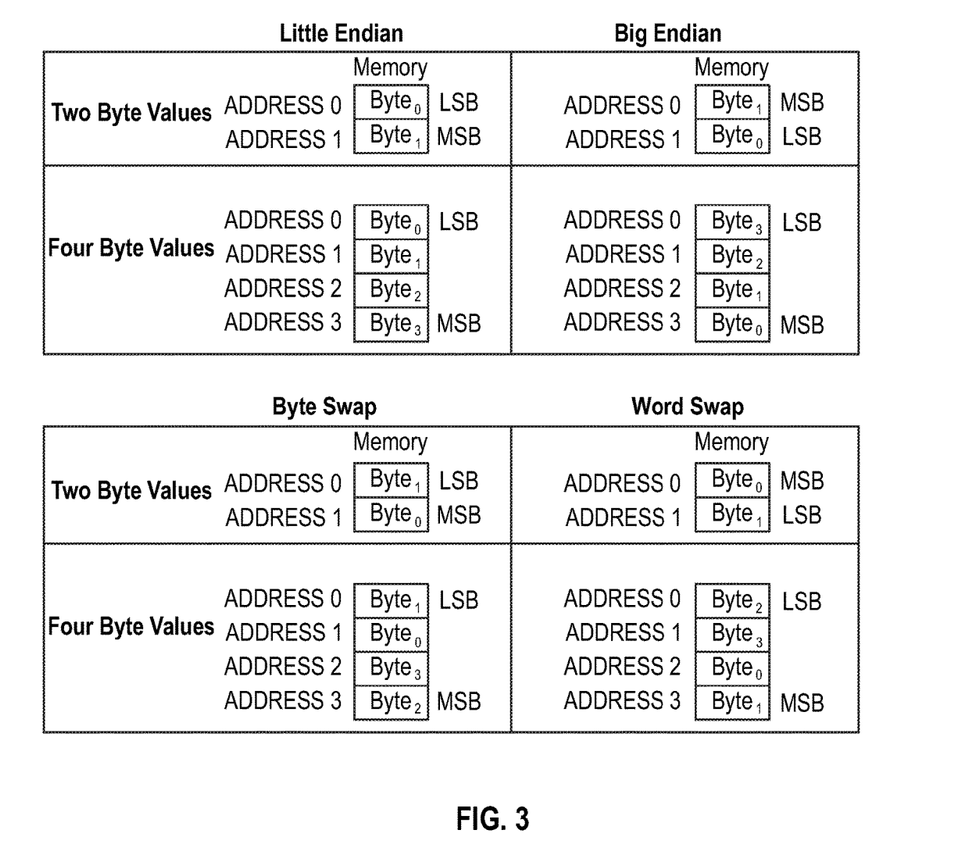
FIG. 3 is a chart showing data interpretation in each of several possible byte order formats.

Receipt of the byte order determination data command 30 from the control device 10 will cause the peripheral device 5 to read the value data sent by the control device in all four of the big endian, little endian, byte swap, and word swap byte orders (see FIG. 3). The byte order format that returns the expected value (2.76 in this example) when the value data is read by the peripheral device is the byte order of the control device 10 (see FIG. 4). If necessary, the peripheral device 5 will subsequently switch its byte order to match the byte order of the control device 10, such that future data and command exchanges will occur with the proper byte order. This prevents errors in data handling and eliminates the need for data conversion.

Figure 5:
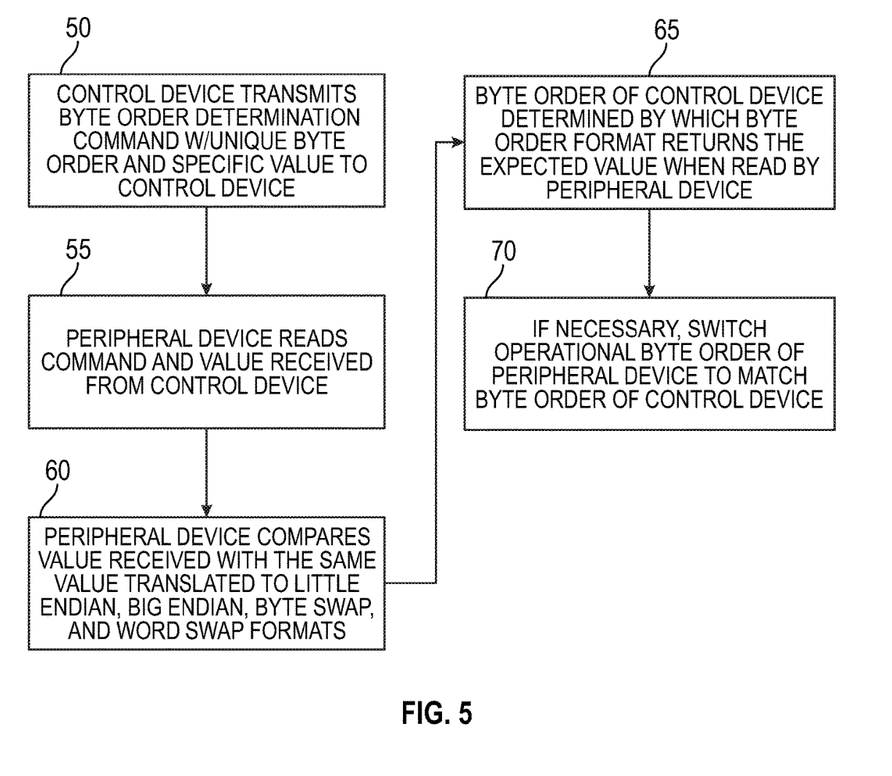
FIG. 5 is a block diagram representing the steps of an exemplary method for ensuring that the byte order of a peripheral device matches the byte order of a control device.

One exemplary method for ensuring the proper byte order for data and command exchanges between a peripheral device and a control device is represented in the flow chart of FIG. 5. As described above, exemplary peripheral device embodiments are enabled to initially receive a special byte order determination data command from a control device, which is likewise enabled to send such a command.

The first specialized data exchange between the peripheral device and the control device in question involves transmission of a byte order determination data command 50 from the control device to the peripheral device. The byte order determination data command has a byte sequence that can be read in any byte order and still have the same value, and also includes a specific data value that is known to both the control device and the peripheral device and has a unique value in each of its byte locations.

Upon receiving the byte order determination data command from the control device, the peripheral device proceeds to read the command and transmitted value 55. During the reading operation, the peripheral device reads the value received in each of the big endian, little endian, byte swap and word swap byte order formats 60. The byte order of the control device is then revealed by determining which of the big endian, little endian, byte swap or word swap formats results in the value data returning the expected value 65 (e.g., 2.76). If necessary, the peripheral device will subsequently switch its operational byte order to match the byte order of the control device 70, such that future data and command exchanges will automatically occur with the proper byte order. As stated above, this prevents errors in data handling and eliminates the need for data conversion.

As used herein, the term "peripheral device" is intended to refer only to a device that is not the controlling device of a multi-device system. As used herein, the term "control device" is intended to refer only to a device that is the controlling device of a multi-device system. A peripheral device may differ in nature from the control device of a given system. Alternatively, a peripheral device and the control device of a given system may be the same type of device arranged in a master-slave hierarchy. Nothing herein should be interpreted as limiting a peripheral device or control device to a device of any particular type.

While certain embodiments of the invention are described in detail above, the scope of the invention is not considered limited by such disclosure, and modifications are possible without departing from the spirit of the invention as evidenced by the following claims:

What is claimed is:

1. A peripheral device with byte order detection functionality, comprising:
    a microprocessor;
    memory; and
    programming stored in the memory, the programming including instructions that, after the peripheral device is placed in communication with a control device having an unknown byte order, will direct the peripheral device to:
    (1) allow receipt from the control device of a byte order determination data command that includes both a byte sequence having a byte order that can be read in any direction and still have the same value, and a specific data value that is known to both the control device and the peripheral device and has a unique value in each of its byte locations;
    (2) analyze, in each of big endian, little endian, byte swap and word swap formats, the data value received from the control device;
    (3) detect the byte order of the control device by determining which of the big endian, little endian, byte swap or word swap formats results in the return of a value that matches the specific data value sent by the control device in the byte order determination data command, and
    (4) if there is a mismatch between the byte order of the peripheral device and the byte order of the control device, switch the operational byte order of the peripheral device to match the byte order of the control device.

2. The peripheral device of claim 1, wherein the peripheral device is a weighing device.

3. The peripheral device of claim 1, wherein the byte order determination data command of the programming has a byte order of 80 80 80 80 in the hexadecimal number system.

4. The peripheral device of claim 1, wherein the specific value sent in the byte order determination data command is 2.76.

5. The peripheral device of claim 1, wherein the programming is adapted to automatically receive the byte order determination data command upon placement of the peripheral device in communication with the control device.

6. The peripheral device of claim 1, wherein the byte order determination data command is receivable only after intervention by a user.

7. A method for performing byte order determination in a system including a peripheral device, comprising:
    using the peripheral device to receive a byte order determination data command that includes both a byte sequence having a byte order that can be read in any direction and still have the same value, and a specific data value that is known by the peripheral device and has a unique value in each of its byte locations;
    using the peripheral device to analyze, in each of big endian, little endian, byte swap and word swap formats, the specific data value; and
    using the peripheral device to discern the byte order in which the data command was transmitted by determining which of the big endian, little endian, byte swap or word swap formats results in the return of a value that matches the specific data value included in the byte order determination data command.

8. The method of claim 7, further comprising switching the operational byte order of the peripheral device to match the byte order of a device from which the byte order determination data command was received if it is determined that there is a byte order mismatch between said devices.

9. The method of claim 7, wherein the byte order of the byte sequence received in the byte order determination data command is 80 80 80 80 in the hexadecimal number system.

10. The method of claim 7, wherein the specific value received in the byte order determination data command is 2.76.

11. The method of claim 7, wherein the byte order determination data command is automatically received by the peripheral device upon placement of the peripheral device in communication with a byte order determination data command transmitting control device.

12. The method of claim 7, wherein the byte order determination data command is receivable by the peripheral device only after being prompted by a user.

13. A method of ensuring byte order matching prior to a control system data exchange, comprising:
    transmitting to a peripheral device from a control device of the control system a byte order determination data command that includes both a byte sequence having a byte order that can be read in any direction and still have the same value, and a specific data value that is known to both the control device and the peripheral device and has a unique value in each of its byte locations;
    using the peripheral device to analyze, in each of big endian, little endian, byte swap and word swap formats, the data value received from the control device;
    using the peripheral device to discern the byte order of the control device by determining which of the big endian, little endian, byte swap or word swap formats results in the return of a value that matches the specific data value sent by the control device in the byte order determination data command; and if there is a mismatch between the byte order of the peripheral device and the byte order of the control device, switching the operational byte order of the peripheral device to match the byte order of the control device.

14. The method of claim 13, the byte order of the byte sequence sent in the byte order determination data command is 80 80 80 80 in the hexadecimal number system.

15. The method of claim 13, wherein the specific value sent in the byte order determination data command is 2.76.

16. The method of claim 13, wherein the byte order determination data command is automatically sent to the peripheral device upon placement of the peripheral device in communication with the control device.

17. The peripheral device of claim 1, wherein the byte order determination data command is sent to the peripheral device only after prompting by a user.

* * * * *